United States Patent
Montgomery (10) Patent No.: US 10,611,112 B2
(45) Date of Patent: Apr. 7, 2020

(54) CENTER MECHANISM FOR TIRE BUILDING DRUM

(71) Applicant: The Goodyear Tire & Rubber Company, Akron, OH (US)

(72) Inventor: Mark John Montgomery, Rootstown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 477 days.

(21) Appl. No.: 15/230,546

(22) Filed: Aug. 8, 2016

(65) Prior Publication Data
US 2018/0022049 A1   Jan. 25, 2018

Related U.S. Application Data

(60) Provisional application No. 62/365,794, filed on Jul. 22, 2016.

(51) Int. Cl.
*B29D 30/24* (2006.01)
*B29D 30/36* (2006.01)
(Continued)

(52) U.S. Cl.
CPC ........... *B29D 30/245* (2013.01); *B29D 30/24* (2013.01); *B29D 30/36* (2013.01); *B29D 30/00* (2013.01);
(Continued)

(58) Field of Classification Search
CPC ...... B29D 30/08; B29D 30/24; B29D 30/245; B29D 30/246; B29D 30/36;
(Continued)

(56) References Cited

U.S. PATENT DOCUMENTS

| 2,614,057 A | 10/1952 | Ericson |
| 3,366,526 A | 1/1968 | Winslow |

(Continued)

FOREIGN PATENT DOCUMENTS

| EP | 692368 B1 | 4/2000 |
| JP | 01237127 A * | 9/1989 |

OTHER PUBLICATIONS

Yuzo Kumagai, JP-01237127-A, machine translation. (Year: 1989).*

(Continued)

*Primary Examiner* — Robert C Dye
*Assistant Examiner* — Sedef E Paquette
(74) *Attorney, Agent, or Firm* — Edward T. Kennedy (57) ABSTRACT

A tire building drum is rotatably mounted on a central drive shaft and includes a center portion. A center mechanism for the drum is disposed in the center portion and includes a hub that seats on and is secured to the central drive shaft. An axially-extending piston seats on and extends circumferentially about the hub. A cylinder cooperates with the hub and the piston to form a pneumatic chamber. A plurality of links are connected to the piston and a plurality of segment bars are disposed about the circumference of the center mechanism. Each one of the segment bars is connected to selected links and seats between a lip of the cylinder and a distal end plate. When compressed air is introduced into the pneumatic chamber, the piston moves in an axial direction, actuating movement of the links and in turn actuating radial movement of the segment bars.

17 Claims, 6 Drawing Sheets

(51) Int. Cl.
   *B29D 30/08* (2006.01)
   *B29D 30/00* (2006.01)
   *B29D 30/26* (2006.01)

(52) U.S. Cl.
   CPC ............ *B29D 30/08* (2013.01); *B29D 30/244* (2013.01); *B29D 2030/2657* (2013.01)

(58) Field of Classification Search
   CPC ....................... B29D 2030/2657; B29D 30/00; B29D 30/20; B29D 30/244
   USPC ................................. 156/414, 417, 420, 415
   See application file for complete search history.

(56) References Cited

U.S. PATENT DOCUMENTS

| | | | |
|---|---|---|---|
| 3,867,231 A | 2/1975 | Casey | |
| 3,959,064 A * | 5/1976 | Touchette | B29D 30/24 156/417 |
| 4,007,081 A | 2/1977 | Mallory | |
| 4,045,277 A * | 8/1977 | Habert | B29D 30/247 156/417 |
| 4,126,507 A | 11/1978 | Kim et al. | |
| 4,220,494 A | 9/1980 | Kawaida et al. | |
| 4,239,579 A | 12/1980 | Felten et al. | |
| 4,390,334 A * | 6/1983 | Singh | B29D 30/0649 425/28.1 |
| 4,425,180 A | 1/1984 | Samokhvalov et al. | |
| 4,510,012 A | 4/1985 | Kawaida et al. | |
| 4,521,269 A | 6/1985 | Ozawa | |
| 4,614,562 A | 9/1986 | Jones | |
| 4,854,612 A * | 8/1989 | Cubric | F16D 1/08 285/18 |
| 5,268,057 A | 12/1993 | Nojiri et al. | |
| 5,269,870 A | 12/1993 | Mori | |
| 5,354,405 A * | 10/1994 | Byerley | B29D 30/247 156/398 |
| 5,433,814 A | 7/1995 | Nojiri | |
| 5,505,803 A | 4/1996 | Byerley | |
| 6,013,147 A | 1/2000 | Byerley | |
| 6,769,468 B2 | 8/2004 | Currie et al. | |
| 6,880,603 B2 | 4/2005 | Akiyama | |
| 7,152,649 B2 | 12/2006 | Sala | |
| 7,287,568 B2 | 10/2007 | Roedseth et al. | |
| 7,288,160 B2 | 10/2007 | Roedseth et al. | |
| 7,704,344 B2 | 4/2010 | Iyanagi et al. | |
| 8,511,359 B2 | 8/2013 | Perlman | |
| 2004/0244914 A1 * | 12/2004 | Byerley | B29D 30/244 156/417 |
| 2006/0137806 A1 | 6/2006 | Roedseth et al. | |
| 2009/0229752 A1 | 9/2009 | Tatara et al. | |
| 2010/0000662 A1 | 1/2010 | Onimatsu | |
| 2014/0048212 A1 | 2/2014 | Weaver et al. | |
| 2015/0114571 A1 | 4/2015 | Weaver et al. | |
| 2015/0360395 A1 * | 12/2015 | Pan | B29D 30/52 264/334 |
| 2016/0176138 A1 | 6/2016 | Roa Guzman | |

OTHER PUBLICATIONS

Merriam-Webster, Definition for "Operatively" (Year: 2010).*
EPO search report received by Applicant dated Nov. 27, 2017.
Chinese search report received by applicant dated Apr. 29, 2019.

* cited by examiner

CENTER MECHANISM FOR TIRE BUILDING DRUM

FIELD OF THE INVENTION

The invention relates to pneumatic tires, and more particularly, to equipment for the manufacture of tires known as tire building drums. Specifically, the invention is directed to a center mechanism for a tire building drum that enables a tire crown height of up to about 2.50 inches to be achieved.

BACKGROUND OF THE INVENTION

In the manufacture of a tire, the tire is typically built on the respective drum of one or more tire-building machines, which is known in the art as a tire building drum. Numerous tire components are wrapped about and/or applied to the drum(s) in sequence, forming a cylindrical shaped tire carcass. The tire carcass is then expanded into a toroidal shape for receipt of the remaining components of the tire such as the belt package and a rubber tread. The completed toroidally-shaped unvulcanized tire carcass, which is known in the art as a green tire, is then inserted into a mold or press for forming of the tread pattern and curing or vulcanization.

When components are wrapped about and/or applied to the tire building drum(s), typically the inner liner, one or more plies and possibly other components are wrapped onto the drum while the drum is in a collapsed state, before tire beads are applied. The beads are then located axially on the drum and the areas of the drum under the beads, known as bead locks, are expanded radially to fix the rest of the tire to the beads. The beads are then moved closer together by axial contraction of the drum, while the area of the drum between the beads, known as the center mechanism, is expanded to form a shoulder to help anchor the beads and provide a surface to apply subsequent components. Such expansion of the center mechanism of the tire building drum is referred to as crowning.

It is desirable that a crown, which is the radial difference between the expanded diameter of the center mechanism and the nominal tire bead diameter, be sufficiently large to enable subsequent components to be applied near their final shape and size. A large crown minimizes distortion when the tire is shaped during the remaining tire building and curing steps. For example, it is desirable to position apex strips vertically against each crown shoulder side to prevent stretching of the ply and separating of the cords. A high crown retains an increased height of the plies as they are applied, which maintains the position of the ply for forming and curing, thereby reducing distortion of the tire components and enabling the tire to have increased integrity.

It is thus desirable to provide as high a crown as possible to in turn increase the integrity of the tire as much as possible. In the prior art, a maximum crown of about 1.5 inches has been typical, but it is desirable to achieve a crown of up to about 2.50 inches. While a larger or higher crown is desirable to minimize distortion during the tire building process, it is difficult to provide a tire building drum that is able to radially contract to the needed diameter while also being able to radially expand to such a high crown distance. In addition, because expansion forces increase with a larger crown, the force that is required to achieve such a high crown is also increased, which is difficult to achieve when the drum must contract to a compact diameter.

Therefore, it is desirable to provide a tire building drum with a center mechanism that enables a high crown diameter of up to about 2.50 inches to be achieved. It is also desirable for the center mechanism to have an efficient construction that is easy to maintain.

SUMMARY OF THE INVENTION

According to an aspect of an exemplary embodiment of the invention, a center mechanism for a tire building drum is provided. The tire building drum is rotatably mounted on a central drive shaft and includes a center portion. The center mechanism is disposed in the center portion of the drum and includes a hub that seats on and is secured to the central drive shaft. An axially-extending piston seats on and extends circumferentially about the hub. A cylinder is disposed about the piston and cooperates with the hub and the piston to form a pneumatic chamber. A plurality of links are operatively connected to the piston and a plurality of segment bars are disposed about the circumference of the center mechanism. Each one of the segment bars is operatively connected to selected links and seats between a lip of the cylinder and a distal end plate. Upon the introduction of compressed air into the pneumatic chamber, the piston moves in an axial direction, which actuates movement of the links that in turn actuate radial movement of the segment bars.

BRIEF DESCRIPTION OF DRAWINGS

The invention will be described by way of example and with reference to the accompanying drawings, in which.

Similar numerals refer to similar parts throughout the drawings.

DETAILED DESCRIPTION OF THE INVENTION

It is to be understood that the term axially refers to a direction that is parallel to the central axis of rotation of the center mechanism and the tire building drum. The term radially inward or inwardly refers to a radial direction that is generally perpendicular to and toward the central axis of rotation of the center mechanism and the tire building drum. The term radially outward or outwardly refers to a radial direction that is generally perpendicular to and away from the central axis of rotation of the center mechanism and the tire building drum.

Figure 1:
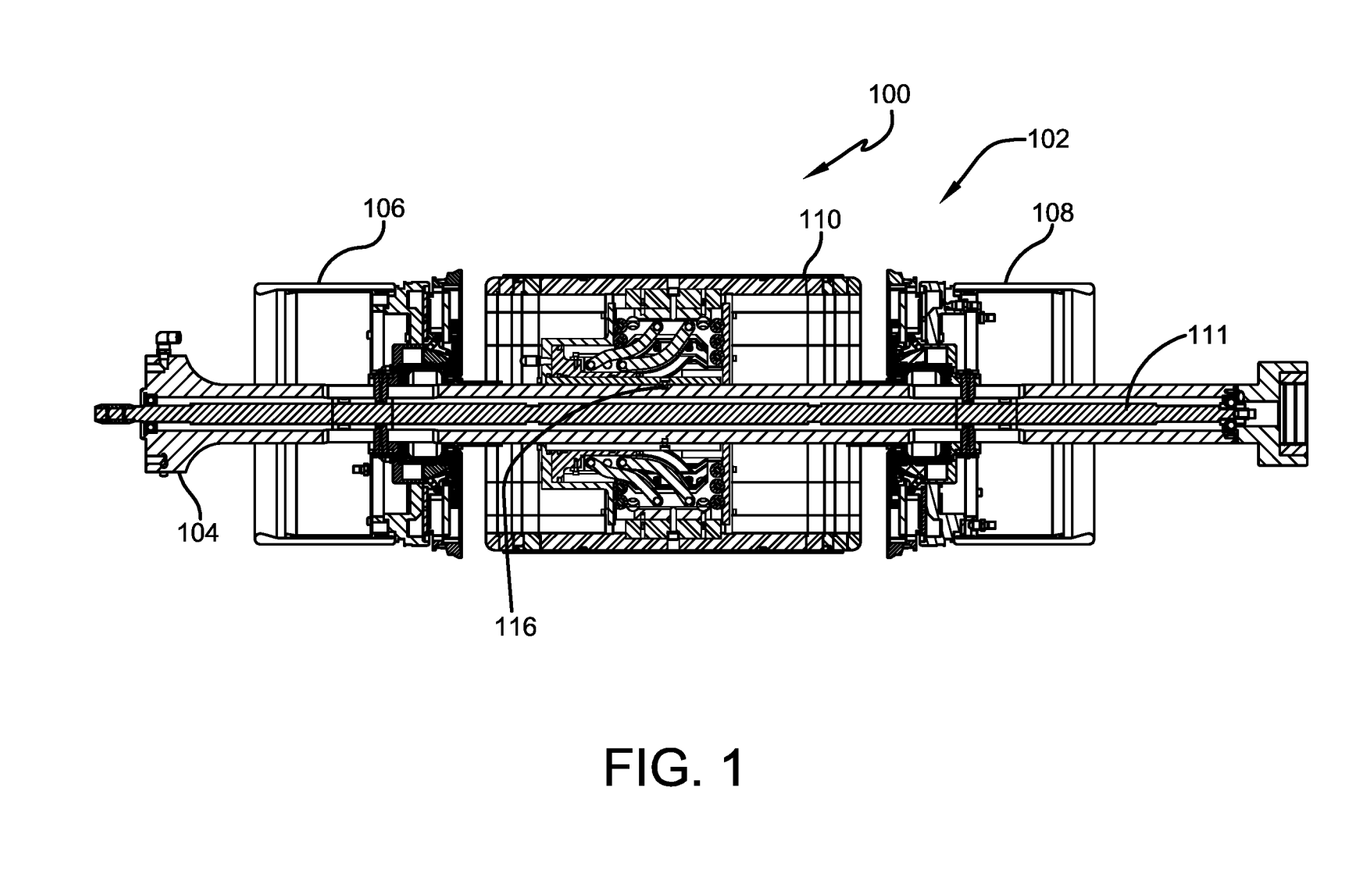
FIG. 1 is a cross sectional view of a tire building drum shown in a retracted state and including an exemplary embodiment of the center mechanism of the present invention.
Figure 2:
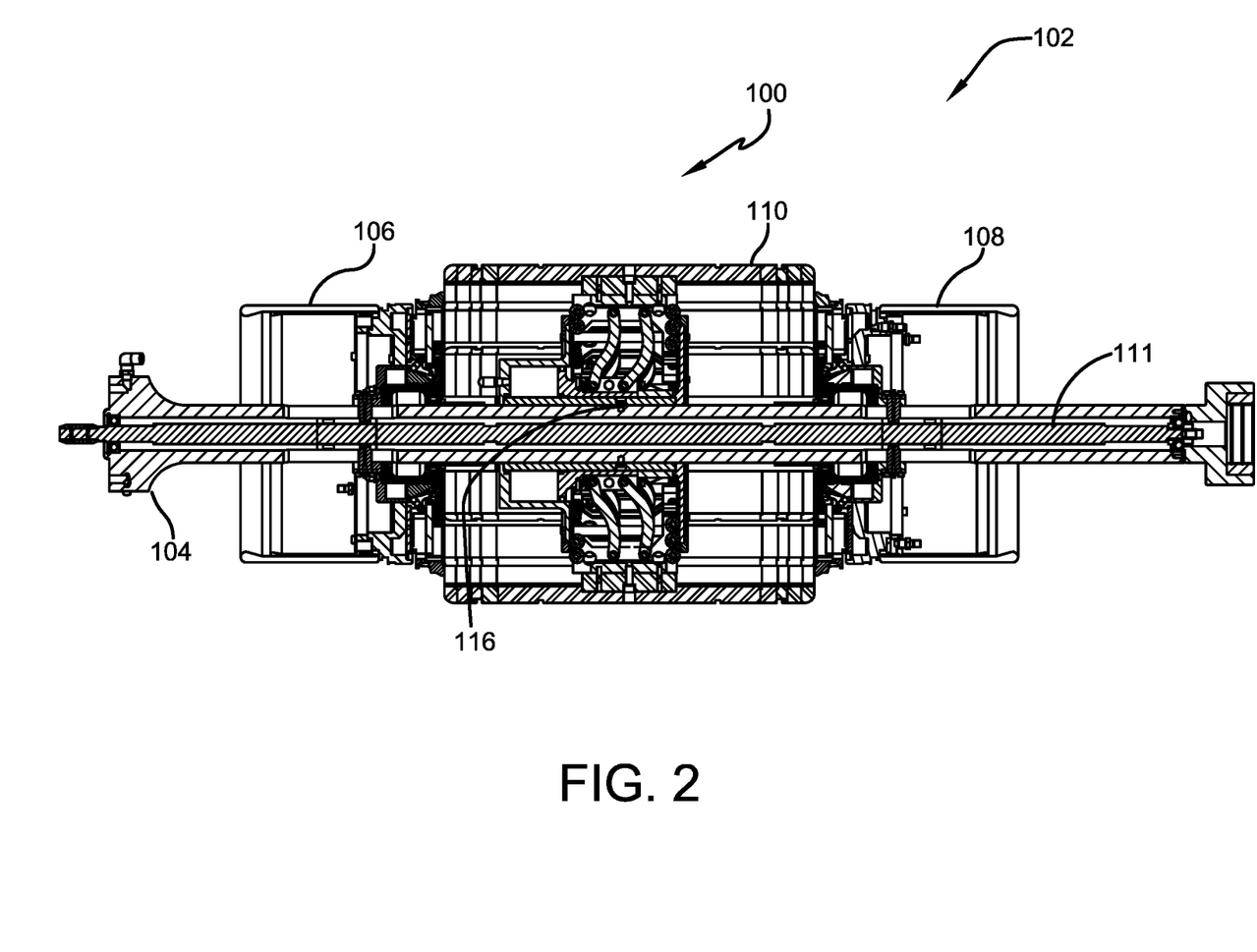
FIG. 2 is a cross sectional view of the tire building drum shown in FIG. 1 in an expanded state.

An exemplary embodiment of the center mechanism of the present invention is indicated generally at 100, and is shown in FIGS. 1 and 2 incorporated into a tire building drum 102. The tire building drum 102 is rotatably mounted on a central drive shaft 104. The tire building drum 102 includes a left hand side 106 and a right hand side 108 that are disposed on each side of a center portion 110. The left hand side 106 and the right hand side 108 are interconnected and positioned relative to the center portion 110 by a center lead screw 111 that is disposed in the central drive shaft 104. The center mechanism 100 is disposed in the center portion 110 of the tire building drum 102.

The center mechanism 100 seats on and is secured to the central drive shaft 104. More particularly, the center mechanism 100 includes a hub 112 that seats on the central drive shaft, and is formed with a pair of openings 114 that are spaced about 180 degrees apart. Each one of the hub openings 114 aligns with a respective one of a pair of openings 116 formed in the drive shaft 104. A mechanical fastener or pin 118 extends through each set of the aligned openings 114 and 116 to secure the hub 112 to the shaft 104. Preferably, each pin 118 is a shear pin that is a deformable sacrificial member in the event that the stress level between the hub 112 and the drive shaft 104 increases beyond a predetermined amount, thereby preventing damage to the hub and/or the draft shaft or other components.

The center mechanism 100 includes an axially-extending piston 120 that actuates radial expansion and retraction of the center mechanism, and thus of the center portion 110 of the tire building drum 102. In order to optimize its performance, the piston 120 preferably includes an inner diameter of about 141 millimeters or 5.55 inches and an outer diameter of about 258.8 millimeters or 10.18 inches.

Turning now to FIGS. 2 through 6, the piston 120 seats on and extends circumferentially about the hub 112. A cylinder 122 is connected to a proximal end 113 of the hub 112, and is disposed about the piston 120. More particularly, the cylinder 122 includes a radially-extending wall 124 that engages the proximal end 113 of the hub 112. The radially-extending wall 124 is formed with a pneumatic port 128 and is adjacent a proximal end 126 of the piston 120 when the center mechanism 100 is in a retracted state. The cylinder 122 also includes an axially-extending wall 132 that commences at a radially outer edge 130 of the radially-extending wall 124 and extends adjacent the outer circumference of the piston 120 to a radially-extending lip 134.

Figure 5:
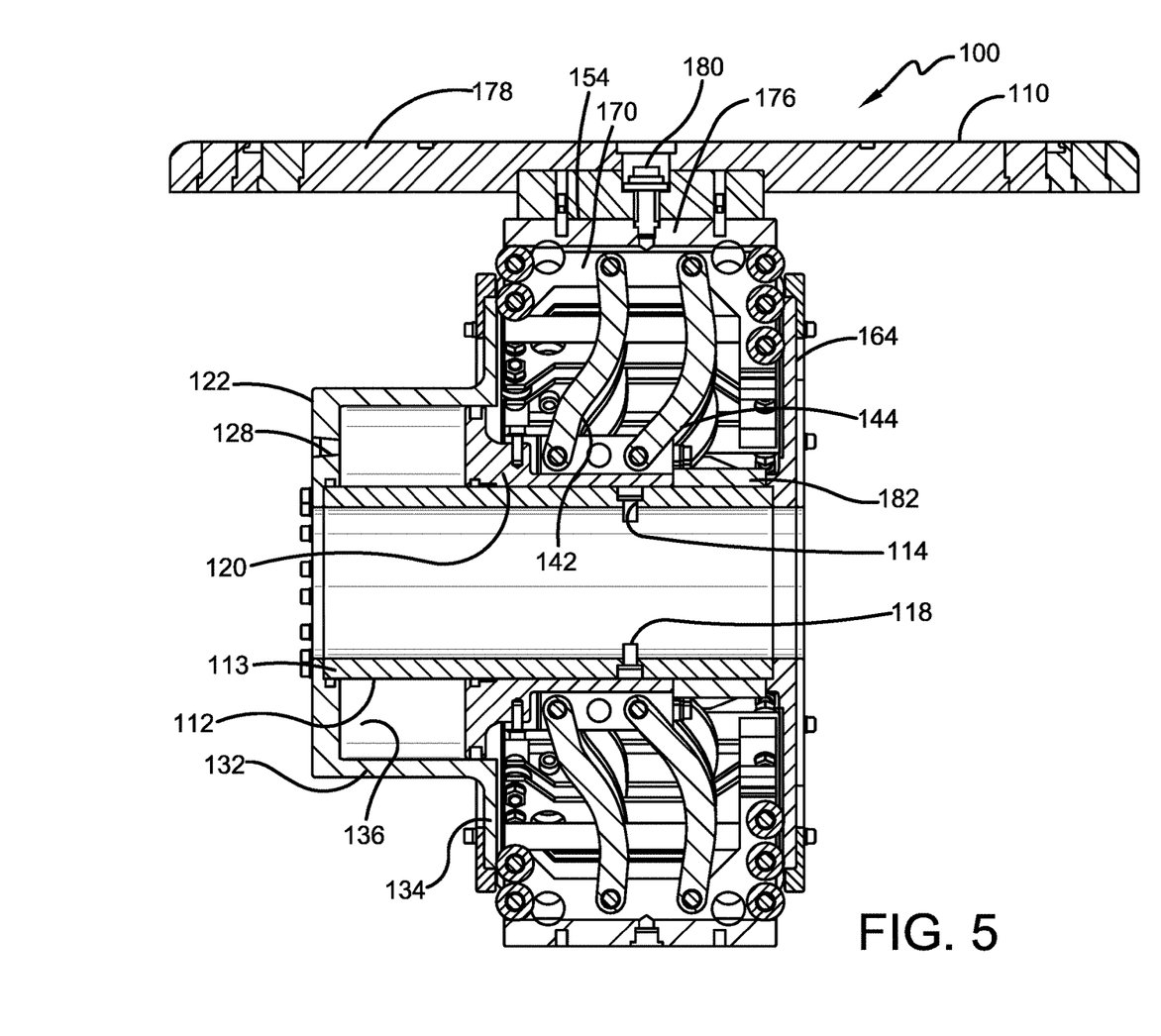
FIG. 5 is an enlarged cross-sectional view of the center mechanism shown in FIG. 1 in an expanded state.
Figure 6:
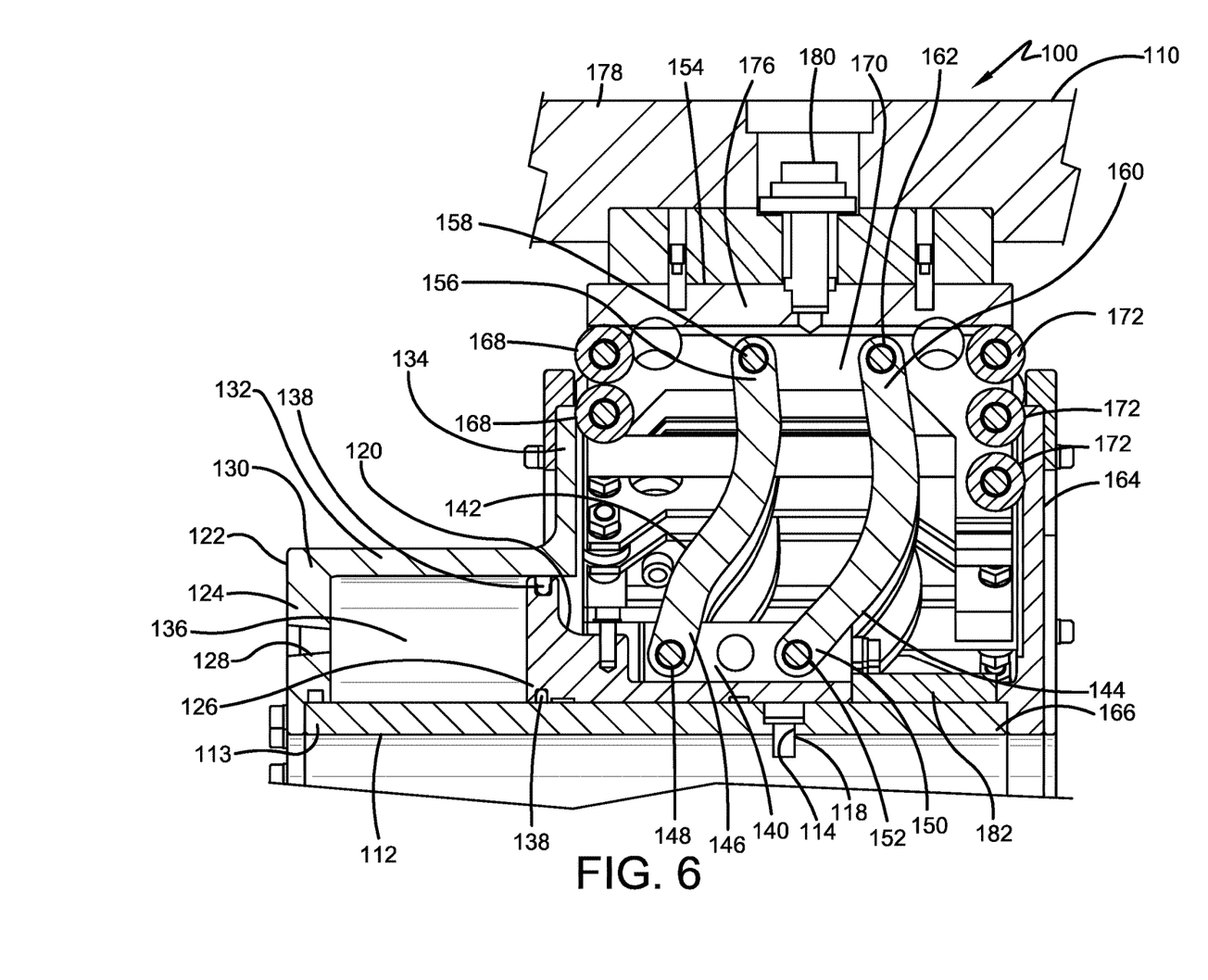
FIG. 6 is a greatly enlarged cross-section view of a portion of the center mechanism shown in FIG. 1 in an expanded state.

A pneumatic chamber 136 is defined by the radially-extending wall 124 of the cylinder 122, the proximal end 126 of the piston 120, the hub 112 and the axially-extending wall 132 of the cylinder. Compressed air is introduced into the pneumatic chamber 136 through the port 128 formed in the radially-extending wall 124 of the cylinder 122, which urges the piston to move away from the radially-extending wall, as shown in FIGS. 5 and 6. Sealing members such as O-rings 138 provide a fluid seal between the piston 120 and the hub 112, as well as between the piston and the axially-extending wall 132 of the cylinder 122.

A plurality of linkage mounts 140 seat on and are rigidly connected to the piston 120. A pair of links includes a first link 142 preferably having a Z-shaped configuration and a second link 144 preferably having a C-shaped configuration. Each link 142 and 144 is pivotally connected to each linkage mount 140. More particularly, a first end 146 of the first link 142 is connected to a respective linkage mount 140 at a pivot connection 148, and a first end 150 of the second link 144 is connected to the linkage mount at a pivot connection 152.

The links 142 and 144 extend radially outwardly to segment bars 154. More particularly, a second end 156 of the first link 142 is connected to a radially-extending wall 170 of a respective segment bar 154 at a pivot connection 158, and a second end 160 of the second link 144 is connected to the radially-extending wall of the segment bar at a pivot connection 162. By way of example, the center mechanism 100 may include about 16 segment bars 154 disposed about its circumference, with a respective first link 142 and a respective second link 144 connecting each segment bar to the piston 120, for a total of 32 links.

A distal end plate 162 is removably connected to a distal end 164 of the hub 112. Each respective segment bar 154 seats between the lip 134 of the cylinder 122 and the distal end plate 162. At least one proximal roller 168 is rotatably connected to the radially-extending wall 170 of a respective segment bar 154 adjacent the lip 134 of the proximal end plate 122. Preferably, two or more proximal rollers 168 are rotatably connected to the radially-extending wall 170 in radial alignment with one another. At least one distal roller 172 is rotatably connected to the radially-extending wall 170 of a respective segment bar 154 adjacent the distal end plate 162. Preferably, two or more distal rollers 172 are rotatably connected to the radially-extending wall 170 in radial alignment with one another. The proximal rollers 168 contact and roll on the lip 132 of the cylinder 122 and the distal rollers 172 contact and roll on the distal end plate 162, thereby enabling aligned and smooth expansion and retraction of each respective segment bar 154.

Each segment bar 154 includes an axially-extending outer wall 176 that is integrally or rigidly connected to the radially-extending wall 170. The center portion 110 of the drum 102 includes axially-extending center deck segments 178 that are each rigidly connected to a respective segment bar 154 by one or more fasteners 180 which engage the outer wall 176 of the segment bar.

To control the stroke of the piston 120, and thus the extent of radial expansion of the center mechanism 100, a collar 182 is disposed about the distal end 166 of the hub 112 adjacent the distal end plate 164. The collar 182 provides a positive mechanical stop for the piston 120 and enables infinite adjustment of the stroke length of the piston. For example, a shorter collar 182 enables a longer stroke of the piston 120, while a longer collar enables a shorter stroke of the piston.

Figure 3:
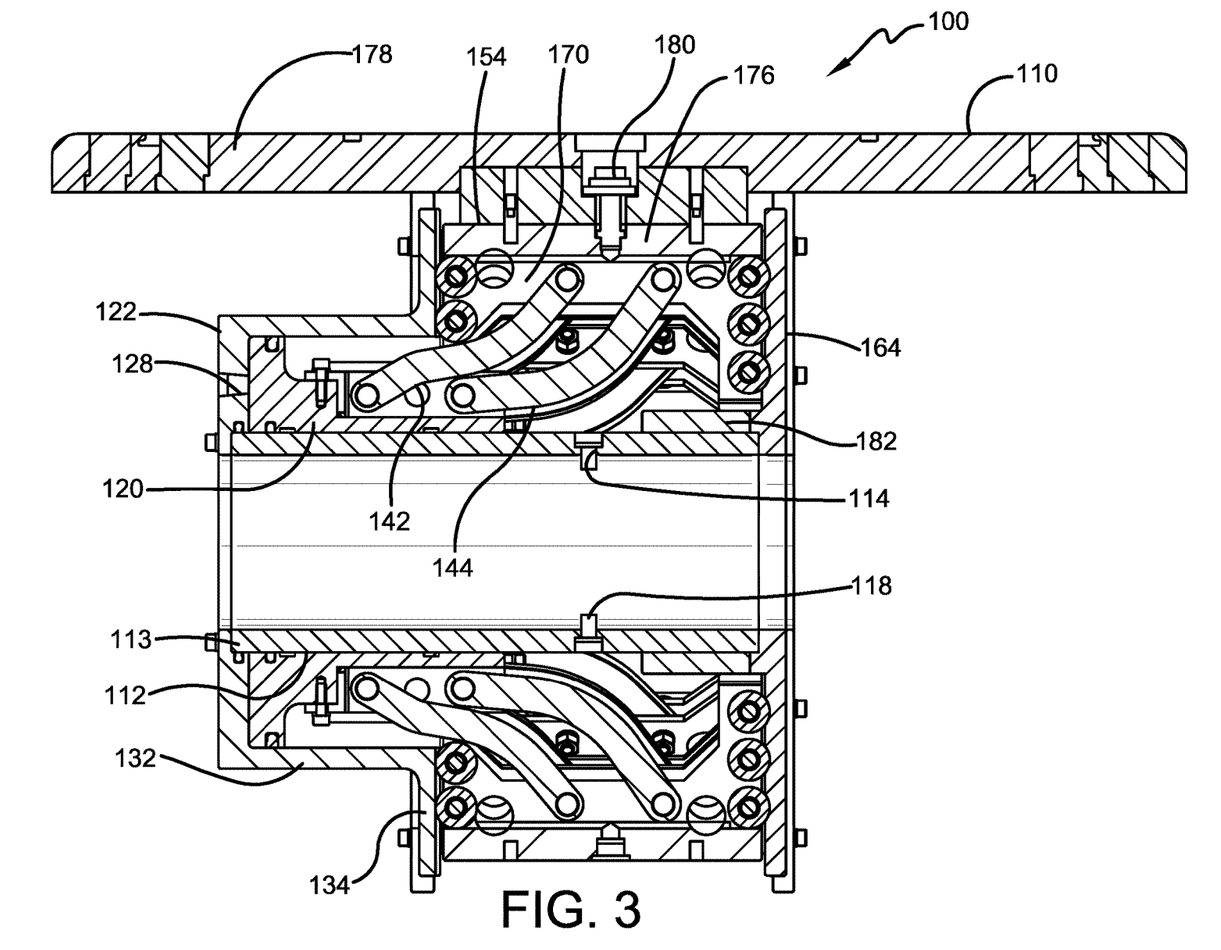
FIG. 3 is an enlarged cross-sectional view of the center mechanism shown in FIG. 1 in a retracted state.
Figure 4:
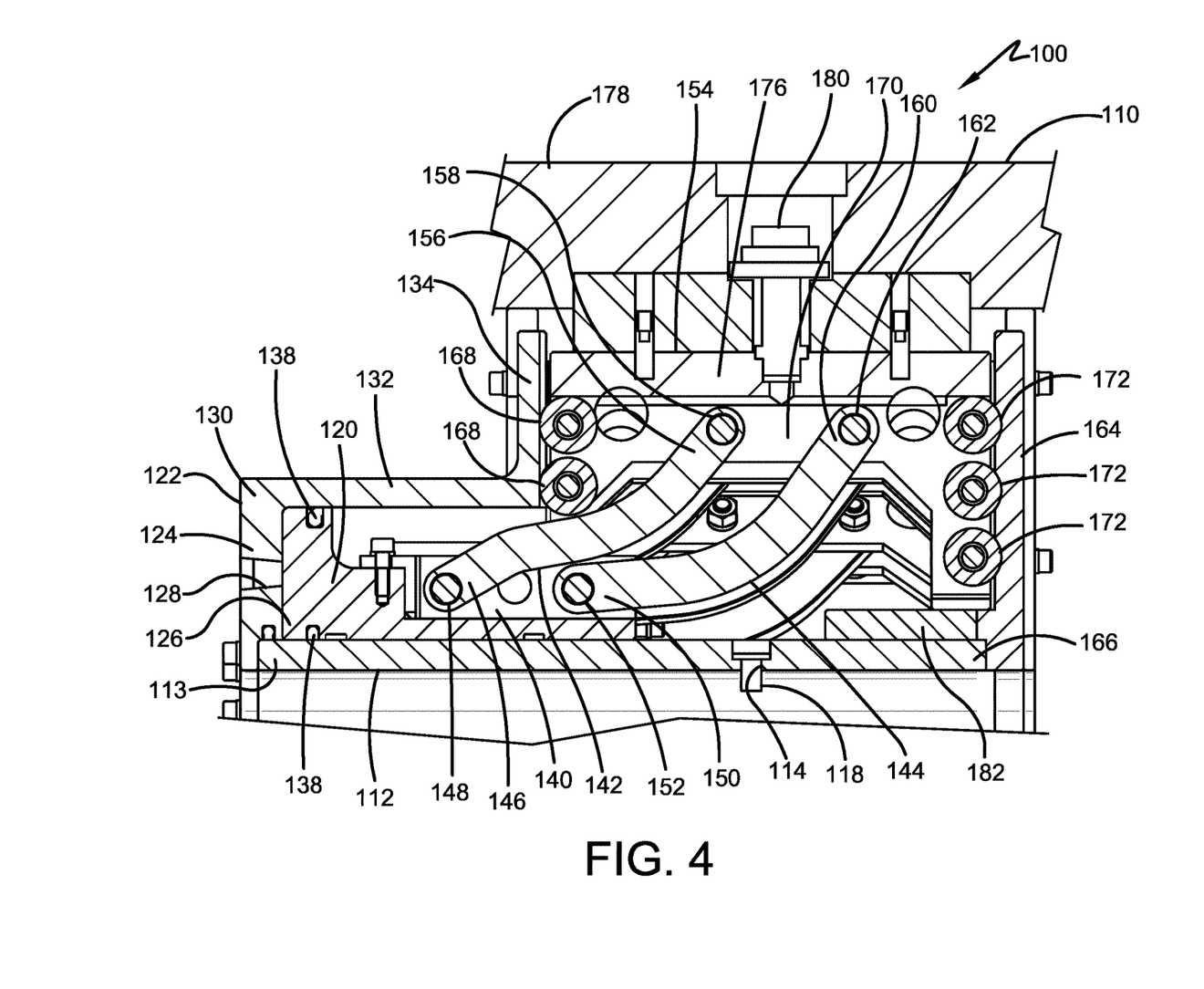
FIG. 4 is a greatly enlarged cross-section view of a portion of the center mechanism shown in FIG. 1 in a retracted state.

With reference now to FIGS. 3 and 4, when the center mechanism 100 is in a retracted state, the piston 120 is disposed adjacent the radially-extending wall 124 of the cylinder 122. To actuate expansion of the center mechanism 100, compressed air is introduced into the pneumatic chamber 136 through the port 128.

As shown in FIGS. 5 and 6, the compressed air urges the piston 120 away from the radially-extending wall 124 of the cylinder 122 in an axial direction. As the piston 120 moves in such a direction, the second end 156 and 160 of each respective link 142 and 144 moves away from the hub 112 in a radial outward direction. The radially outward movement of the second end 156 and 160 of each link 142 and 144 urges each respective segment bar 154 to move radially outwardly, which results in expansion of the center mechanism 100. The segment bars 154 move radially in a smooth, uniform manner due to the engagement of the proximal roller(s) 168 against the lip 134 of the cylinder 122 and the engagement of the distal roller(s) 172 against the distal end plate 164. The radially outward limit of movement of the segment bars 154 is controlled by the engagement of the piston 120 with the collar 182.

To retract the segment bars 154, the flow of compressed air through the port 128 is stopped and a vacuum is applied to the port. The vacuum urges the piston 120 away from the distal end plate 164 in an axial direction. As the piston 120 moves in such a direction, the second end 156 and 160 of each respective link 142 and 144 moves radially inwardly toward the hub 112. The radially inward movement of the second end 156 and 160 of each link 142 and 144 urges each respective segment bar 154 to move radially inwardly, which results in retraction of the center mechanism 100. The radially inward limit of movement of the segment bars 154 is controlled by the engagement of the proximal end 126 of the piston 120 with the radially-extending wall 124 of the cylinder 122.

In this manner, the center mechanism 100 provides a structure that enables a tire crown height of up to about 2.50 inches to be achieved. In the tire building operation, it is desirable to position apex strips vertically against each crown shoulder side to prevent stretching of the ply and separating of the cords. A high crown retains an increased height of the plies as they are applied, which maintains the position of the ply for forming and curing, thereby enabling the tire to have increased integrity. Achieving a crown height of up to about 2.50 inches thus enables the production of tires with increased integrity.

The center mechanism 100 enables such a high crown height to be achieved while the center portion 110 is capable of retracting to a relatively small diameter, such as about 20 inches. Based upon a crown height of 2.50 inches, the center portion 110 is capable of expanding to a maximum diameter of about 25 inches. The use of the single axially-oriented piston 120 desirably enables such an expansion to be maintained at an optimum force level and at a reduced air pressure when compared to the prior art. For example, to form a crown on a tire having a diameter of about 20 inches, the center mechanism 100 requires an air pressure of about 50 pounds per square inch and produces a piston force of about 2,860 pounds. In contrast, prior art mechanisms require an air pressure of about 123 pounds per square inch to achieve this same force. As an additional example, to form a crown on a tire having a diameter of about 23 inches, the center mechanism 100 requires an air pressure of about 80 pounds per square inch and produces a piston force of about 4,570 pounds. In contrast, prior art mechanisms require an air pressure of about 197 pounds per square inch to achieve this same force.

The single axially-oriented piston 120 also desirably enables the center mechanism 100 to retract using a reduced vacuum level when compared to the prior art. The center mechanism 100 of the invention may use a combination of high volume of air and/or high pressure to obtain a full stroke of the piston 120, which desirably provides a variety of ways to control stroke speed.

Moreover, easy control over the stroke length of the center mechanism 100 is enabled by the mechanical stop provided by the collar 182. For example, the center mechanism 100 can be used to build tires that have a one-inch crown height using a longer collar 182. The distal end plate 164 may easily be removed to change the longer collar 182 and replace it with a shorter one. Upon re-installation of the distal end plate 164, the center mechanism 100 can then be used to build tires with a 2.5 inch crown height.

The center mechanism 100 of the invention has an efficient construction that is less complicated than prior art center mechanisms, which enables the invention to be easier to build and maintain than the prior art. In addition, components of the center mechanism 100 of the invention may be formed of materials such as aluminum to enable the mechanism to be desirably lighter than prior art center mechanisms.

The present invention also includes a method of forming a tire using a tire building drum 102 that incorporates the center mechanism 100. The method includes steps in accordance with the description that is presented above and shown in FIGS. 1 through 6.

It is to be understood that the structure of the above-described center mechanism 100 may be altered or rearranged, or components known to those skilled in the art omitted or added, without affecting the overall concept or operation of the invention. In addition, the center mechanism 100 of the present invention may be employed with types of tire building drums 102 other than those shown and described herein.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A center mechanism for a tire building drum, the tire building drum being rotatably mounted on a central drive shaft and including a left hand side, a right hand side and a center portion disposed between the left hand side and the right hand side, the center mechanism being disposed in the center portion of the drum, the center mechanism comprising:
   a hub seating on and being secured to the central drive shaft, the hub including a proximal end disposed proximate the left hand side of the tire building drum and a distal end disposed proximate the right hand side of the tire building drum;
   a single axially-extending piston seating on and extending circumferentially about the hub;
   a cylinder being disposed about the piston at the proximal end of the hub and cooperating with the hub and the piston to form a pneumatic chamber;
   a distal end plate being connected to the distal end of the hub;
   a plurality of linkage mounts being rigidly connected to the piston;
   a plurality of links being pivotally connected to the linkage mounts; and
   a plurality of segment bars being disposed about the circumference of the center mechanism, each one of the segment bars being operatively connected to selected links and seating between a lip of the cylinder and the distal end plate, whereby upon the introduction of compressed air into the pneumatic chamber, the piston moves in an axial direction, thereby actuating movement of the links which in turn actuate radial movement of the segment bars.

2. The center mechanism for a tire building drum of claim 1, wherein the cylinder is formed with a radially-extending wall that is formed with a pneumatic port to enable the introduction of compressed air into the pneumatic chamber.

3. The center mechanism for a tire building drum of claim 1, wherein the plurality of links includes pairs of links, in which a first link of each pair includes a first end being pivotally connected to a selected one of the linkage mounts, and a second link of the pair includes a first end being pivotally connected to the selected linkage mount.

4. The center mechanism for a tire building drum of claim 3, wherein the first link of each pair includes a second end being pivotally connected to a radially-extending wall of a selected one of the segment bars, and a second link of the pair includes a second end being pivotally connected to the radially-extending wall of the selected segment bar.

5. The center mechanism for a tire building drum of claim 3, wherein the first link of each pair of links is formed with a Z-shaped configuration and the second link of each pair of links is formed with a C-shaped configuration.

6. The center mechanism for a tire building drum of claim 1, wherein the distal end plate is removably connected to the distal end of the hub.

7. The center mechanism for a tire building drum of claim 6, wherein at least one proximal roller is rotatably connected to a radially-extending wall of a selected one of the segment bars adjacent the lip of the cylinder, and at least one distal roller is rotatably connected to the radially-extending wall of the selected segment bar adjacent the distal end plate.

8. The center mechanism for a tire building drum of claim 1, further comprising a collar being disposed about the distal end of the hub adjacent the distal end plate to form a positive mechanical stop for the piston.

9. The center mechanism for a tire building drum of claim 1, wherein the hub is formed with at least one opening that aligns with an opening formed in the central drive shaft of the tire building drum, and the aligned hub opening and drive shaft opening receive a deformable mechanical fastener.

10. The center mechanism for a tire building drum of claim 1, wherein the hub is formed with a pair of openings, each one of the hub openings aligning with a respective opening formed in the drive shaft of the tire building drum, each of the aligned hub openings and drive shaft openings receiving a deformable mechanical fastener.

11. The center mechanism for a tire building drum of claim 1, wherein the piston includes an inner diameter of about 141 millimeters.

12. The center mechanism for a tire building drum of claim 1, wherein the piston includes an outer diameter of about 258.8 millimeters.

13. The center mechanism for a tire building drum of claim 1, wherein the center mechanism requires an air pressure of about 50 pounds per square inch to produce a piston force of about 2,860 pounds.

14. The center mechanism for a tire building drum of claim 1, wherein the center mechanism requires an air pressure of about 80 pounds per square inch to produce a piston force of about 4,570 pounds.

15. The center mechanism for a tire building drum of claim 1, wherein the plurality of segment bars being disposed about the circumference of the center mechanism includes sixteen segment bars.

16. The center mechanism for a tire building drum of claim 15, wherein the plurality of links being operatively connected to the piston includes two links for each segment bar.

17. A center mechanism for a tire building drum, the tire building drum being rotatably mounted on a central drive shaft and including a left hand side, a right hand side and a center portion disposed between the left hand side and the right hand side, the center mechanism being disposed in the center portion of the drum, the center mechanism comprising:
 a hub seating on and being secured to the central drive shaft, the hub including a proximal end disposed proximate the left hand side of the tire building drum and a distal end disposed proximate the right hand side of the tire building drum;
 a single axially-extending piston seating on and extending circumferentially about the hub;
 a cylinder being disposed about the piston at the proximal end of the hub and cooperating with the hub and the piston to form a pneumatic chamber;
 a distal end plate being connected to the distal end of the hub;
 a collar being disposed about the distal end of the hub adjacent the distal end plate to form a positive mechanical stop for the piston;
 a plurality of links being operatively connected to the piston; and
 a plurality of segment bars being disposed about the circumference of the center mechanism, each one of the segment bars being operatively connected to selected links and seating between a lip of the cylinder and the distal end plate, whereby upon the introduction of compressed air into the pneumatic chamber, the piston moves in an axial direction, thereby actuating movement of the links which in turn actuate radial movement of the segment bars.

* * * * *